United States Patent Office 3,733,370
Patented May 15, 1973

3,733,370
UNSATURATED ESTER GROUP TERMINATED POLYDIENES AS UNSATURATED POLYESTER MODIFIERS
Ronald E. Thompson, Park Forest, Ill., and Patrick W. Ryan, Glen Mills, Pa., assignors to Atlantic Richfield Company, Philadelphia, Pa.
No Drawing. Filed May 6, 1971, Ser. No. 140,938
Int. Cl. C08f 43/02, 43/08, 29/12
U.S. Cl. 260—862
14 Claims

ABSTRACT OF THE DISCLOSURE

Polyester resins of increased flexibility and strength are obtained by mixing usually liquid, unsaturated polyesters with certain, usually liquid, polymerizable polydiene ethylenically-unsaturated esters having terminal, allylic, acyloxy groups, such as acryloxy, which are terminally ethylenically-unsaturated, thereby forming usually liquid polymerizable compositions which are polymerizable to solid polymers. Commercial unsaturated polyester resins containing 0 to about 75% by weight of styrene can be used. From about 5 to 95% of the polymerizable polydiene ethylenically-unsaturated ester can be used in the composition, although usually about 10 to 50% by weight is preferred.

---

This invention relates to polymeric compositions formed from unsaturated polyesters. More particularly, this invention relates to polymerizable compositions of unsaturated polyesters and the resulting unsaturated polyester polymers.

Unsaturated polyesters are well-known in the art and are generally formed by the esterification reaction of a dicarboxylic acid or anhydride with a dihydric alcohol, at least one of these reactants, preferably the dicarboxylic acid, having alpha, beta-ethylenic unsaturation. The unsaturated polyesters so produced contain ethylenic unsaturation in the essentially linear chains. These unsaturated polyesters can be further polymerized through cross-linking because they are unsaturated.

Unsaturated polyesters can be formed by condensation of an unsaturated dicarboxylic acid, or its anhydride, usually of 4 to about 8 carbon atoms, and a dihydric alcohol, usually of 2 to about 8 carbons. Often an ethylenically saturated carboxylic acid or its anhydride is also used in the condensation. Maleic anhydride and fumaric acid are among the usual alpha, beta-ethylenically unsaturated aliphatic dicarboxylic acid components. Phthalic anhydride, isophthalic acid, adipic or azelaic acid are usually saturated dicarboxylic acids, generally of about 4 to 10 carbon atoms. The commonly used dihydric alcohols or glycols are alkylene glycols, usually of 2 to about 8 carbon atoms, and as ethylene, propylene, diethylene, dipropylene and butylene glycols.

Such unsaturated polyesters are well-known in the art as shown by U.S. Pats. 2,794,785, issued June 4, 1957, 3,041,305, issued June 26, 1962, 3,042,650, issued July 3, 1962, and 3,431,319, issued Mar. 4, 1969. However, properties of polymers formed from these unsaturated polyesters have not been entirely satisfactory in some respects. Attempts have been made by various methods to modify the properties of these unsaturated polyester polymers or resins so as to make them more useful. It is customary in many commercial unsaturated polyesters to include styrene monomer which is copolymerized with the unsaturated polyesters. The ratio of unsaturated polyester to styrene in these commercial polymeric compositions may vary from about 25 to 100% by weight, often from about 30 to 80% by weight, of the total unsaturated polyester-styrene monomer. The styrene monomer is about 75 to 0% by weight and often from about 20 to 70% by weight of the total unsaturated polyester-styrene monomer composition. A preferred range of unsaturated polyester content is from about 50 to about 70% by weight of the total unsaturated ester-styrene monomer weight, the styrene being about 50 to 30% by weight.

Commercially available unsaturated polyester can be prepared by esterification of maleic anhydride, phthalic anhydride and propylene glycol, in mole ratio of 1 mole part of maleic anhydride, 1 mole part of phthalic anhydride and 2.2 mole parts of propylene glycol. These commercially available unsaturated polyester compositions can contain varying ratios of styrene or no styrene. The make-up of the polyesters with respect to ratio of anhydrides to glycols can also vary over wide ranges and with choice of components. One of these commercial unsaturated polyester compositions is sold under the trademark "Paraplex" and another under the trademark "Koplac." Paraplex P–43, for example, contains about 70% unsaturated polyester and 30% styrene. However, this polyester with styrene is known to be a very brittle polymer having very low impact properties.

It has now been found, in accordance with the present invention, that unsaturated solid polyester resins of increased flexibility and strength can be obtained by incorporating therein certain polymerizable polydiene ethylenically-unsaturated esters having terminal, ethylenically-unsaturated acyloxy groups. These polymerizable polydiene ethylenically-unsaturated esters have an average of at least about 1.8 to about 2.8 and up to 3 or more, terminal, allylic, acyloxy groups having terminal ethylenic unsaturation, i.e. a terminal methylene group, and the acyl group is preferably of 3 to about 12 carbon atoms, such as acrylyloxy and methacrylyloxy groups.

In the polymeric compositions and copolymerized resins or polymers of this invention, the polymerizable polydiene ethylenically unsaturated ester can be from about 5 to 95% of the total monomer weight, preferably about 10 to 50% by weight, and the unsaturated polyester, including styrene, if present, can be about 95 to 5% by weight, preferably about 50 to 90% by weight of the total polymeric composition and of the resulting copolymerized solid resin.

The intermediate polymeric compositions of this invention are formed by mixing together the polymerizable polydiene ethylenically-unsaturated ester and the unsaturated polyester, with or without styrene. The polymeric mixture is usually a liquid composition which can be used as a coating composition, such as for boat hulls and swimming pools, and for casting and impregnating in the electrical industry as well as sealants, such as for pipe joint sealers, adhesives and for molded articles. These polymeric compositions of this invention can be used for the same purposes as the commercial unsaturated polyesters wherever a more flexible and very strong resin is desired.

The copolymerization of the polymeric mixtures of polydiene ethylenically-unsaturated esters and unsaturated polyesters, with or without styrene, can be accomplished by known suitable polymerization techniques. These include heat curing and catalyst initiated copolymerizations, using the well-known catalysts for polymerizing unsaturated polyesters, such as organic peroxides, e.g. benzoyl peroxide and the like. These catalysts may be added to the polymeric mixture in catalytic amounts, such as about 0.5 to 2.5% by weight. Temperatures of about 50° C. to 250° C. may be used to effectively copolymerize the polymeric mixture to a very strong copolymer having enhanced flexibility.

The preparation of the polymerizable polydiene ethylenically unsaturated esters employed in this invention are more fully described in our copending application, Ser. No. 715,155, filed Mar. 22, 1968 now U.S. Pat. 3,652,520.

The usually liquid polymerizable polydiene ethylenically unsaturated esters having an average of at least about 1.8 terminal, allylic acyloxy groups which are terminally ethylenically-unsaturated can be prepared by esterifying a usually liquid intermediate polyhydroxy polymer having an average of at least about 1.8 predominantly primary, terminal, allylic hydroxy groups per molecule with an acyl compound, reactive with hydroxyl to form an ester, and having its acyl group terminally ethylenically-unsaturated, i.e., having a terminal methylene group, such as terminally ethylenically-unsaturated aliphatic hydrocarbon acids, preferably of 3 or 4 to about 12 carbon atoms, such as acrylic and methacrylic acids.

These usually liquid polydiene ethylenically-unsaturated esters can be mixed with unsaturated polyesters, with or without styrene, to form polymeric compositions. The polydiene ethylenically-unsaturated esters can be co-polymerized through the terminal ethylenically-unsaturated acyloxy groups to produce solid copolymers with the unsaturated polyesters and, if desired, also with styrene.

The intermediate polyhydroxy polymers have an average of at least about 1.8 predominantly primary, terminal, allylic hydroxyl groups per molecule and are an addition polymer containing 0 to about 75% by weight of an alpha-monolefin of 2 to about 12 carbon atoms and about 25 to 100% of a 1,3-diene of 4 to about 12 carbon atoms, the intermediate polyhydroxy polymer having a viscosity at 30° C. of about 5–20,000 poises, having the majority, i.e., more than 50%, of its unsaturation in the main carbon chain, and a number average molecular weight of about 400 to 25,000. The intermediate polyhydroxy polymers used in this invention are particular hydroxylterminated polymers and copolymers of dienes with other reactive monomers and can be prepared by the hydrogen peroxide-isopropanol mutual solvent process described hereinafter. In addition, suitable derivatives derived therefrom are also applicable provided the alcohol moiety of the polymer with its primary, terminal, allylic structure remains intact. These include partially or totally hydrogenated or halogenated hydroxyl - terminated polybutadiene resins having the majority of its unsaturation in the main carbon chain.

The intermediate polyhydroxy polymer has a particular structure and contains allylic hydroxyl groups, which usually are at the ends of the main; that is, the longest, hydrocarbon chain of these usually liquid diene polymers. These intermediate polyhydroxy polymers differ from the homopolymers and copolymers of butadiene and related dienes which are commercially aviilable as GR-S rubber, etc. The intermediate polyhydroxy polymers may, in general, have a viscosity at 30° C., of about 5–20,000 poises, preferably about 15 to 5000 poises. Often the intermediate polymer, when a homopolymer, is obtained in a viscosity range of about 20 to 300 or up to about 550 poises at 30° C. Preferably, the intermediate polyhydroxy polymers have a viscosity of about 35 to 60 or up to about 190 to 260 poises. Thus, the intermediate polyhydroxy polymers are liquids or semi-solids flowable, at least when subjected to moderate pressure, at ambient temperatures or at temperatures up to about 400° F. The allylic hydroxy-terminated intermediate polymers used in the present invention will have molecular weights in the range of about 400 to about 25,000 as determined by cryoscopic, ebullioscopic or osomometric methods. The preferred hydroxyl-containing diene polymers will be in the molecular weight range of about 900 to 10,000. In contrast, conventional diene polymers such as GR-S rubber are extremely high in molecular weight, e.g., in the range of several hundred thousand.

The hydroxy-terminated diene intermediate polymers employed to make the novel compositions of this invention differ from diene polymers known to be telechelic and/or hydroxy-containing in that the majority of unsaturation in the former is in the main hydrocarbon chain and in that the hydroxy components are in predominantly terminal positions on the main hydrocarbon chain and are predominantly primary and allylic in configuration. Ordinarily, at least about 1.8, often at least about 2 or more, frequently 2.1 to 2.8 and up to about 3 or more hydroxyl groups are present on the average per intermediate polymer molecule. Since these hydroxyl groups are predominantly primary, terminal and allylic in structure, with approximately two of the hydroxyl groups being at terminating positions on the main carbon chain, the polymers are highly reactive. The intermediate polyhydroxy polymer has the majority of its unsaturation in the main hydrocarbon chain and this appears to provide polymers of improved elasticity characteristics.

The dienes which are employed to make the intermediate polymers include the unsubstituted, 2-substituted or 2,3-disubstituted 1,3-dienes of 4 up to about 12 carbon atoms. The diene preferably has up to 6 carbon atoms and the substituents in the 2- and/or 3-position may be hydrogen, alkyl, generally lower alkyl, e.g., of 1 to 4 carbon atoms, aryl (substituted or unsubstituted), halogen, nitro, nitrile, etc. Typical dienes which may be employed are 1,3-butadiene, isoprene, chloroprene, 2-cyano-1,3-butadiene, 2,3-dimethyl-1,3-butadiene, 2-phenyl - 1,3 - butadiene, 2-methyl-3-phenyl-1,3-butadiene, etc. The choice of diene will usually depend upon properties desired in the final elastomer.

Although intermediate polymers of the above-described type, averaging more than one predominantly primary hydroxyl per molecule, say about 1.8 to 3 or more per molecule, may be employed in this invention, they preferably have an average of at least 2 or more or about 2.1 to 2.4 up to 2.8 hydroxyl groups per molecule and the hydroxyl groups are predominantly in terminal, allylic positions on the main, generally longest, hydrocarbon chain of the molecule. By "allylic" configuration is meant the alpha-allylic grouping of allylic alcohol; that is, the terminal hydroxyls of the intermediate polymer are attached to a carbon adjacent to a double-bond carbon.

The ratio of cis-1,4 and trans-1,4 and 1,2-vinyl unsaturation which occurs in the diene polymers used in the present invention, the number and location of the hydroxyl groups and the molecular weight of the intermediate polymers can be a function of polymerization temperature and the type of addition polymerization system employed in forming the polymer. It has been found that diene polymers of the desired configuration can be obtained using hydrogen peroxide as the catalyst for polymerization in a mutual solvent system. This free-radical addition polymerization usually takes place in solution at a temperature above about 100° C. to 200° C., preferably.

The reaction preferably takes place in a mutual solvent system; that is, one which dissolves both the diene monomer and the hydrogen peroxide. Suitable solvents include isopropanol, methanol, sec-butanol, acetone, n-butanol, n-propanol, methyl ethyl ketone and like saturated alcohols or ketones preferably alkanols, having 2 to about 12 carbon atoms. The $H_2O_2$— solvent system is found to supply hydroxyl groups and the catalytic and solvent effects needed to produce the intermediate diene polymers of desired chemical and physical characteristics. In such a polymerization system the alcohol or ketone serves as a solvent for the peroxide and as a solvent or diluent for the diene monomer and is used in an amount suitable to promote adequately rapid but controllable polymerization of the monomer material in the solution to form the diene polymers. The solvent will be free of any group which would interfere with the production of the desired diene polymer. Saturated alcohols are preferred and often those having about the same carbon atom content as the diene monomer will be found most useful. Thus, propanol or isopropanol is often used in butadiene polymerization. The $H_2O_2$— solvent system may also contain ethers, alcohol-ketones, alcohol-ethers and alcohol-esters which are miscible in water in all proportions and which do not contain polymerizable carbon-to-carbon unsaturation or otherwise interfere with polymerization or enter into the product. The peroxide material may be used in amounts of about 1% to 15% of the reaction mixture to assure a low molecular weight addition polymer product having more than two hydroxyl groups per molecule.

The usable intermediate polyhydroxy polymers of butadiene will have the majority of their unsaturation in the main carbon chain and will conform to the following simplified chemical structure:

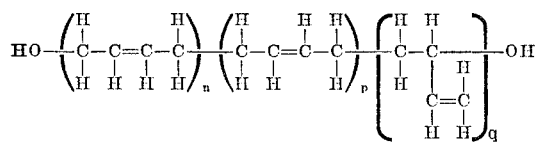

in which $n$ plus $p$ is greater than $q$; that is, the in-chain unsaturation accounts for more than 50% of the unsaturation. One or more of the hydrogens appearing in the above formula may be replaced by hydroxyl or hydroxyl-bearing groups in some of the molecules. This formula should not be understood as implying that the polymers are necessarily in blocks, but the cis-1,4-trans-1,4- and vinyl (1,2) unsaturation are usually distributed throughout the polymer molecule. Generally, $n$ will be a number sufficient to give a cis-1,4- unsaturation content of about 10–30 percent; $p$ will be a number sufficient to give a trans-1,4- unsaturation content to the polymer in the range of about 40–70 percent while $q$ will be sufficient to give a pendant 1,2-vinyl unsaturation of about 10–35 percent. Often, the polymer will contain largely trans-1,4-units, e.g., about 50–65 percent and about 15–25 percent cis-1,4-units, with about 15–25 percent 1,2-units. Branching may also occur in the above polymers, especially those prepared at higher temperatures. These hydroxyl terminated polybutadiene resins are usually low molecular weight liquid polymers composed mainly of butadiene units in their backbone structure.

Olefinically-unsaturated monomers may be incorporated into the diene intermediate polymer products used in this invention and these may often be components which provide cross-linking sites. Usable monomers include alpha-mono-olefinic materials of about 2 or 3 to 10 or about 12 carbon atoms, such as styrene, vinyl toluene, methyl methacrylate, methylacrylate, acrylic esters, vinyl chloride, vinylidene chloride, etc. Acrylonitrile, acrylic acid, vinylidene cyanide, acrylamide, etc., provide low-molecular weight hydroxy-terminated diene intermediate copolymers which have sites suitable for cross-linking. As can be seen, the usable olefinic monomers may be ethylenes, substituted with halogen, aromatic hydrocarbon, or even cyano or carboxyl-containing radicals in some instances. The choice and amount of monoolefinic monomer employed will often be determined on the basis of properties desired in the final elastomer resin. For example, solvent-resistant rubbers may be formulated by copolymerization of butadiene with acrylonitrile, or other monoolefin, substituted with a non-hydrocarbon radical, to produce the intermediate polymer. Generally, the amount of monoolefinic monomer in the polymer will be 0 to 75% by weight of the total addition polymer, preferably about 1 to 40% or even about 10–40%, and the balance can be essentially the 1,3 diene.

In addition to the homopolymers and copolymers comprised of single dienes and single monolefinic or vinyl monomers, the present invention may also use intermediate polymers made from combinations of a plurality of dienes and monoolefinic monomers. For example, mixtures of butadiene, isoprene and styrene can be polymerized to afford low molecular weight hydroxyl-containing inter-polymers. Various combinations of dienes and monoolefinic monomers may be copolymerized to produce hydroxyl-containing copolymers or interpolymers which may be used to form elastomers. Also, the polymer materials used in this invention may be given improved oxidation and ozone resistance by hydrogenating the hydroxyl-containing diene polymers to their corresponding more-saturated derivatives. Usually, the hydroxyl-containing diene polymers used in the present invention will at most be only partially hydrogenated, so as to provide a material which is more stable due to diminished unsaturation but which still has good elastomer properties.

The main criteria for the unsaturated acid or acyl compound is that once reacted with the hydroxyl-terminated polydiene resin, the acyl compound introduces a reactive polymerizable double bond into the liquid polydiene resin. One type of unsaturated acid or acyl compound which can be used is represented by the following structure:

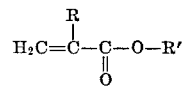

wherein R=H, alkyl, —$CO_2R'$, CN, halogen, or phenyl. R'=H, lower alkyl, or aromatic, such as phenyl.

Various ethylenically-unsaturated acyl compounds reactive with hydroxyl to form an ester and having the acyl group ethylenically-unsaturated, preferably of 3 or 4 to about 12 carbon atoms, and usually aliphatic hydrocarbon, can be used. Thus, there can be used an acrylyl or methacrylyl compound, such as acrylic acid, acrylyl chloride or other halide, methyl acrylate, methacrylic acid, methacrylyl chloride or other halide; and methyl methacrylate. It is preferable to employ an aliphatic hydrocarbon ethylenically unsaturated acyl compound of 3 or 4 to about 12 carbon atoms in the acyl group and which has terminal ethylenic unsaturation, i.e., a terminal methylene group at the end of the acyl group. This affords active terminal, ethylenic unsaturation in the allylic acyloxy end groups of the polydiene polymers thus facilitating further polymerization. The polydiene polymer is often fully acylated, although it can be only partially acylated. When the polydiene polymer is fully acylated, it will have per molecule an average number of predominantly primary, terminal, allylic, ethylenically-unsaturated acyloxy groups corresponding in number to the predominantly primary, terminal, allylic, hydroxy groups which were in the unacylated polydiene polymer.

Any suitable method of esterification of the intermediate polyhydroxy polymer can be used to prepare the unsaturated polydiene esters and polyesters of this invention including direct esterification with an ethylenically-unsaturated acid, trans-esterification with an ethylenically-unsaturated ester, and esterification with an ethylenically-unsaturated acyl chloride or other halide. In addition, other suitable methods of esterification, including use of conventional esterification catalysts, can be used to prepare the unsaturated polydiene esters and are applicable. By suitably adjusting the ratio of mole equivalents of the ethylenically-unsaturated acyl compound to the mole equivalents of the intermediate polyhydroxy polymer, the polyester can be obtained. Usually an excess of ethylenically-unsaturated acyl compound is used to obtain the polyester.

The reaction of polyhydroxybutadiene with acrylic acid halide can be depicted as follows:

HO—$CH_2$—CH=CH—polybutadiene—CH=CH—$CH_2$—OH
+ 2(X—C—CH=$CH_2$)     (X=halogen) ⟶
       ‖
       O

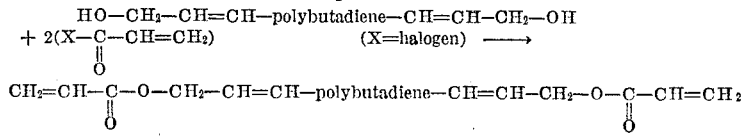

(unsaturated polydiene polyester or fully acylated unsaturated ester).

Four hydroxyl-terminated polybutadiene polymers and copolymers are described as being exemplary of those which can be used in the present invention.

Polybutadiene 45 is a polyhydroxybutadiene homopolymer typically having a viscosity of 46 poises at 30° C., a hydroxyl content of 0.84 meq./gm., a hydoxyl number (mg. KOH/gm.) of 47, an average molecular weight of 2700, about 2.3 terminal, allylic, hydroxyl groups which are predominantly primary, and an iodine number of 395. The polymer can be prepared by polymerizing 100 parts of butadiene in the presence of 70 parts of isopropanol and 10 parts of hydrogen peroxide in an aluminum clad autoclave at 118° C. for 2 hours.

A polyhydroxy acrylonitrile-butadiene copolymer is prepared having a viscosity of 493 poises at 30° C., a hydroxyl content of 0.57 meq./gm., an average molecular weight of about 4400, and about 2.5 terminal, allylic hydroxyl groups, which are predominantly primary per polymer molecule. This type of copolymer can be made by copolymerizing acrylonitrile with butadiene in isopropanol solvent and in the presence of hydrogen peroxide using the following ratio of reactants: 85 parts butadiene, 15 parts acrylonitrile, 70 parts isopropanol, 12 parts hydrogen peroxide (50%). The reactants are heated in an autoclave at 115° C. for 2 hours and stripped.

A polyhydroxy styrene-butadiene copolymer is prepared having a molecular weight of about 3700, a viscosity at 30° C. of 220 poises, a hydroxyl content (meq./gm.) of 0.68, about 2.5 terminal, allylic, hydroxyl groups which are predominantly primary per polymer molecule. This type of copolymer can be made by polymerizing 75 parts butadiene and 25 parts styrene in the presence of 70 parts isopropanol and 10 parts of 50% hydrogen peroxide for 2 hours 20 minutes at 120° C.

A polyhydroxybutadiene homopolymer is prepared having a viscosity of 223 poises at 30° C., a hydroxyl content (meq./gm.) of 0.68, an average molecular weight of about 3800, and about 2.6 terminal allylic, hydroxy groups which are predominantly primary per polymer molecule. This type of polymer can be prepared by polymerizing 100 parts of butadiene in the presence of 35 parts of isopropanol and 6 parts of 50% hydrogen peroxide for 3 hours at 130° C.

The following ethylenically-unsaturated acyl esters of hydroxyl-terminated diene polymers are described as being exemplary of those which can be used in the present invention.

EXAMPLE A

Preparation of polybutadiene 45 acrylate

A solution of 238 g. (0.200 equivalent) of polybutadiene 45 and 2.77 g. of hydroquinone (1.0% of total reactants weight) was stirred in 400 ml. of benzene under a nitrogen atmosphere without heating. Then 36.21 g. (0.400 equivalent 100% excess) of acrylyl chloride was added with constant stirring over the course of 2.0 hours. The reaction solution was then heated to 49.0±0.5° C. with stirring for 160 hours.

After the reaction solution had been cooled to room temperature, it was extracted four times with 100 ml. portions of 2.5% sodium hydroxide, followed by five extractions with 100 ml. portions of water. After being dried over anhydrous magnesium sulfate and filtered, the solution was placed in a flash evaporator and the bulk of benzene removed under plant vacuum to a pot temperature of 60° C. The last traces of volatile matter were removed under a vacuum of 0.1 mm. of mercury at a pot temperature of 60° C.

At this point, the material was a slightly cloudy, light yellow, viscous oil. Quantitative elemental analysis gave the following results: Calc., Carbon: 86.64%, Hydrogen 10.79%; Found: Carbon: 86.23%, Hydrogen: 10.79%. An infrared analysis of this product was in excellent agreement with the structure of the fully acylated ester, polybutadiene 45 acrylate. As the infra-red spectrum showed no absorption attributable to hydroxy groups, this indicated that all of the hydroxyl groups had been acylated. The yield of this material was 208 g. (83.6% yield).

EXAMPLE B

Preparation of polybutadiene 45 methacrylate

A mixture of 119 g. of polybutadiene 45 (0.100 equivalent, 50.06 g. of methyl methacrylate (0.500 equivalent; 400% excess), and 1.71 g. of hydroquinone (1.0% of total reactants weight) was heated to the vicinity of 90° C. with constant stirring. At this temperature a total of 2.0 ml. of catalyst (tetro-iso-propyl titanate) was added over the course of 3.0 hours. The temperature of the reaction was then increased to the vicinity of 105° C. for an additional 23.0 hours. At this point, the heating was discontinued and the reaction mixture was cooled to room temperature.

The crude reaction mixture was stirred with 100 ml. of benzene and 100 ml. of water. The resulting emulsion was centrifuged; the deep red supernatant liquid was decanted, dried over anhydrous magnesium sulfate, and filtered. The bulk of the benzene and unreacted methyl methacrylate was removed on the flash evaporator under plant vacuum to a pot temperature of 60° C. The residual volatiles were removed at a pressure of 0.1 mm. of mercury to a pot temperature of 60° C.

At this point, the material was a clear, deep red, mobile liquid. Quantitative elemental analysis gave the following results: Calculated, Carbon: 86.15%, Hydrogen: 10.80%: Found: Carbon: 86.31%, Hydrogen: 10.85%. An infra-red absorption spectrum of a sample of this material was in excellent agreement with the structure for the fully acylated ester, polybutadiene 45 methacrylate. The yield of this material was 119 g. (94.6% yield).

EXAMPLE C

Homopolymer of polybutadiene 45 acrylate

The liquid polybutadiene 45 acrylate of Example A was homopolymerized in bulk with 1.0 weight percent benzoyl peroxide at 80° C. for 24 hours. The resulting homopolymer was a rubber.

EXAMPLE D

Polybutadiene 45 acrylate-styrene copolymers

Polybutadiene 45 acrylate prepared as in Example A and styrene were copolymerized at various weight ratios as shown in Table 1 using the following method. A mixture of a weighed amount of polybutadiene 45 acrylate and of styrene was placed in a vessel with 1% benzoyl peroxide (by weight of total monomers). This mixture was heated to 60° C. with constant stirring for 5 to 15 minutes, to dissolve the benzoyl peroxide and insure complete mixing of the components into a homogeneous solution. This solution was slowly and carefully poured into a 12" x 12" x 18" cavity of a vertical sandwich mold. The top spacer was then inserted and the mold placed in an oven, thermostatically controlled at 130° F. (55° C.) for 88 hours. Upon cooling, the specimens were demolded, trimmed, and submitted for qualitative physical testing. Properties of the test samples are shown in Table 1. As the polybutadiene 45 acrylate content increased, the copolymers produced transformed from rigid, opaque, white, impact resistant, very strong plastic similar to high impact styrene to semi-flexible plastic to very flexible, clear, light yellow elastomers.

TABLE 1.—POLYMERIZATION OF POLYBUTADIENE 45 WITH STYRENE

| Polybutadiene 45 acrylate | | Styrene | | | Benzoyl peroxide | | Remarks |
|---|---|---|---|---|---|---|---|
| Wt. (g.) | Wt. percent | Wt. (g.) | Wt. percent | T.M.W.* (g.) | Wt. (g.) | Wt. percent | |
| 80.0 | 50.0 | 80.0 | 50.0 | 160.0 | 1.60 | 1.0 | Very flexible, clear light yellow elastomer. |
| 64.0 | 40.0 | 96.0 | 60.0 | 160.0 | 1.60 | 1.0 | |
| 50.0 | 33.3 | 100.0 | 66.7 | 150.0 | 1.50 | 1.0 | |
| 50.0 | 25.0 | 150.0 | 75.0 | 200.0 | 2.00 | 1.0 | |
| 30.0 | 20.0 | 120.0 | 80.0 | 150.0 | 1.50 | 1.0 | Semi-flexible plastic. |
| 30.0 | 15.0 | 170.0 | 85.0 | 200.0 | 2.00 | 1.0 | |
| 15.0 | 10.0 | 135.0 | 90.0 | 150.0 | 1.50 | 1.0 | |
| 7.5 | 5.0 | 142.5 | 95.0 | 150.0 | 1.50 | 1.0 | Rigid, opaque, white impact resistant, very strong plastic. |

*T.M.W.=Total "Monomer" Weight.

EXAMPLE I

Copolymers of polybutadiene 45 acrylate and unsaturated polyester with styrene Polybutadiene 45 acrylate prepared as in Example A and an unsaturated polyester of about 70% by weight in about 30% by weight of styrene monomer were copolymerized at various weight ratios as shown in Table 3 using the following method. A mixture of a weighed amount of polybutadiene 45 acrylate and the unsaturated polyester of about 70% weight in about 30% weight of styrene monomer was placed in a vessel with 1% benzoyl peroxide (by weight of total monomers). The mixture was heated to 60° C. with constant stirring for 5 to 15 minutes, to dissolve the benzoyl peroxide and insure complete mixing of the components into a homogeneous solution. This solution was slowly and carefully poured into a 12″ x 12″ x ⅛″ cavity of a vertical sandwich mold. The top spacer was then inserted and the mold placed in an oven, thermostatically controlled at 130° F. (55° C.) for 88 hours. The sample was then heated in the mold to 250° F. (121° C.) for one hour. Upon cooling, the specimens were demolded, trimmed, and submitted for qualitative physical testing. Properties of the test samples are shown in Table 2. The polymer of the unsaturated polyester and styrene was a strong, nearly clear, quite rigid plastic. However, as shown by Table 2, with only 15% by weight of polybutadiene 45 acrylate copolymerized with 85% by weight of the unsaturated polyester and styrene, there was obtained a very strong, cloudy, semi-rigid plastic.

Instead of the unsaturated polyester with 30% styrene monomer, there can be copolymerized with the polybutadiene ester, e.g., polybutadiene 45 acrylate or polybutadiene 45 methacrylate, the unsaturated polyester with more or less amount of styrene or without styrene. The styrene can be present in amounts up to 75% by weight of the total styrene-unsaturated polyester composition. Any of the unsaturated polyesters can be mixed with the polybutadiene esters, e.g., the polybutadiene 45 acrylate or the polybutadiene 45 methacrylate and copolymerized under the conditions set forth in this example to give plastic resins of increased flexibility and enhanced strength.

the presence of usually 2+ unsaturated ester moieties on the polybutadiene esters. The polymeric composition of polydiene ester and unsaturated polyester can be used in making fiberglass reinforced polyester. The resultant polyester composition has increased flexibility and higher impact resistance; that is, more resistance to breakage by mechanical shock. The polymeric compositions of this invention are usually liquids which are castable and readily cured to solid plastics of increased flexibility and impact strength.

If desired, additional materials, such as extenders and finely-divided solid fillers can be incorporated, especially prior to copolymerization in the polymeric compositions of this invention. Some conventional fillers are carbon black, asphaltenes, silica, silica-alumina, hydrated silica, zinc oxide, magnesium carbonate, clays, talc and pulverized reclaimed rubber as well as other various mineral reinforcing or inert fillers which are known in the art. Solid fillers may be employed, if desired, in the amount of 0–100 or more parts per 100 parts by weight of copolymers in the final product, and when used in significant amounts, usually at least about 5% by weight is employed, based on the copolymers.

It is claimed:
1. A polymerizable composition consisting essentially of
   (a) an unsaturated polyester of an ethylenically-unsaturated aliphatic dicarboxylic acid and an alkylene glycol in admixture with about 0–75% of styrene by weight of the unsaturated polyester-styrene monomer, and
   (b) from about 5 to 95% by weight, based on said polymerizable composition, of a polymerizable polydiene ethylenically-unsaturated ester containing per molecule an average of about 1.8 to 3 terminal, allylic-positioned, ethylenically-unsaturated acyloxy groups of 3 to about 12 carbon atoms, said polymerizable polydiene ethylenically-unsaturated ester being the esterification product of an intermediate polyhydroxy polymer and an ethylenically-unsaturated acyl compound being reactive with hydroxyl to form an ester, having its acyl group ethylenically-unsaturated and having 3 to about 12 carbon atoms, and said intermediate polyhydroxy polymer having TABLE 2.—POLYMERIZATION OF POLYBUTADIENE 45 ACRYLATE 30% STYRENE/70% UNSATURATED POLYESTER RESIN*

| Polybutadiene 45 acrylate | | Styrene and polyester resin* | | | Benzoyl peroxide | | Remarks |
|---|---|---|---|---|---|---|---|
| Wt. (g.) | Wt. percent | Wt. (g.) | Wt. percent | T.M.W.(g.) | Wt. (g.) | Wt. percent | |
| 30.0 | 15.0 | 170.0 | 85.0 | 200.0 | 2.00 | 1.0 | Very strong, cloudy, semi-rigid plastic. |
| 20.0 | 10.0 | 180.0 | 90.0 | 200.0 | 2.00 | 1.0 | |
| 10.0 | 5.0 | 190.0 | 95.0 | 200.0 | 2.00 | 1.0 | |
| 0.0 | 0.0 | 200.0 | 100.0 | 200.0 | 2.00 | 1.0 | Strong, nearly clear, quite rigid plastic. |

*1 mole maleic anhydride to 1 mole phthalic anhydride to 2.2 mole propylene glycol.

NOTE: T.M.W.=Total Monomer Weight.

As seen from the examples, the polybutadiene esters, e.g., the polyacrylate esters of polybutadiene 45, are effective for cross-linking and introducing flexibility and increased strength into unsaturated polyester resins. These copolymers of polybutadiene esters and unsaturated polyesters are not thermoplastic and are cross-linked due to an average of about 1.8 to 3 predominantly primary, terminal, allylic hydroxyl groups per molecule and being an addition polymer of 0 to about 75% by weight of an alpha-mono-olefin of 2 to about 12 carbon atoms and about 25 to 100% by weight of a 1,3-diene of 4 to about 12 carbon atoms, said intermediate polyhydroxy polymer having a viscosity at 30° C. of about 5–20,000 poises, having the majority of its unsaturation in the main carbon chain, and a number average molecular weight of about 400 to 25,000.

2. A polymerizable composition of claim 1 wherein said polymerizable polydiene ethylenically unsaturated ester is from about 10 to 50% by weight of said polymerizable composition.

3. A polymerizable composition of claim 1 wherein said terminal, allylic, acyloxy groups are selected from the group consisting of acrylyloxy and methacrylyloxy groups.

4. A polymerizable composition of claim 1 wherein said 1,3-diene is butadiene.

5. A polymerizable composition consisting essentially of
 (a) an unsaturated polyester of an alpha, beta-ethylenically unsaturated aliphatic dicarboxylic acid and an alkylene glycol in admixture with about 0–75% of styrene by weight of the unsaturated polyester-styrene monomer, and
 (b) from about 5 to 95% by weight, based on said polymerizable composition, of a polymerizable polydiene ethylenically-unsaturated ester containing per molecule an average of about two to about three terminal, allylic-positioned, ethylenically-unsaturated acyloxy groups of 3 to about 12 carbon atoms, said polymerizable polydiene ethylenically-unsaturated ester being the esterification product of an intermediate polyhydroxy polymer and an ethylenically-unsaturated acyl compound being reactive with hydroxyl to form an ester, having its acyl group ethylenically-unsaturated and having 3 to about 12 carbon atoms, and said intermediate polyhydroxy polymer having an average of at least about two predominantly primary, terminal, allylic hydroxyl groups per molecule and being an addition polymer of a 1,3-diene hydrocarbon of 4 to about 12 carbon atoms, said intermediate polyhydroxy polymer having a viscosity at 30° C. of about 5–20,000 poises, having the majority of its unsaturation in the main carbon chain, and a number average molecular weight of about 400 to 25,000.

6. A polymerizable composition of claim 5 wherein said polymerizable polydiene ethylenically unsaturated ester is from about 10 to 50% by weight of said polymerizable composition.

7. A polymerizable composition of claim 5 wherein said terminal, allylic, acyloxy groups are selected from the group consisting of acrylyloxy and methacrylyloxy groups.

8. A polymerizable composition of claim 5 wherein said 1,3-diene hydrocarbon is butadiene.

9. A polymerizable composition consisting essentially of
 (a) an unsaturated polyester of an alpha, beta-ethylenically unsaturated aliphatic dicarboxylic acid and an alkylene glycol in admixture with about 0–75% of styrene by weight of the unsaturated polyester-styrene monomer, and
 (b) from about 10 to 50% by weight, based on said polymerizable composition, of a polymerizable polydiene ethylenically-unsaturated ester containing per molecule an average of two to about three terminal, allylic-positioned, ethylenically-unsaturated acyloxy groups, said polymerizable polydiene ethylenically-unsaturated ester being the esterification product of an intermediate polyhydroxy polymer and an acrylyl compound, reactive with hydroxyl to form an ester, said intermediate polyhydroxy polymer having an average of at least about two predominantly primary, terminal, allylic hydroxyl groups per molecule and being an addition polymer of butadiene, said intermediate polyhydroxy polymer having a viscosity at 30° C. of about 15 to 5000 poises, having the majority of its unsaturation in the main carbon chain, and a number average molecular weight of about 900 to 10,000.

10. A solid polymer of the polymerizable composition of claim 1.

11. A solid polymer of the polymerizable composition of claim 4.

12. A solid polymer of the polymerizable composition of claim 5.

13. A solid polymer of the polymerizable composition of claim 8.

14. A solid polymer of the polymerizable composition of claim 9.

References Cited
UNITED STATES PATENTS

| | | | |
|---|---|---|---|
| 3,055,952 | 9/1962 | Goldberg | 260—635 |
| 3,135,716 | 6/1964 | Uranek et al. | 260—45.5 |
| 3,222,421 | 12/1965 | Lundberg | 260—872 |
| 3,231,634 | 1/1966 | Wismer et al. | 260—862 |
| 3,300,544 | 1/1967 | Parker | 260—866 |
| 3,455,801 | 7/1969 | D'Alelio | 204—159.19 |
| 3,583,955 | 6/1971 | Molicky et al. | 260—78.4 |

WILLIAM H. SHORT, Primary Examiner

E. A. NIELSEN, Assistant Examiner

U.S. Cl. X.R.

260—873